United States Patent [19]

Tusim

[11] 4,360,489

[45] Nov. 23, 1982

[54] PROCESS FOR ADDING MAGNESIUM OXIDE TO FILM FORMING VINYLIDENE CHLORIDE COPOLYMER COMPOSITIONS

[75] Inventor: Martin H. Tusim, Fresno, Calif.

[73] Assignee: The Dow Chemical Company, Midland, Mich.

[21] Appl. No.: 230,913

[22] Filed: Feb. 2, 1981

[51] Int. Cl.$^3$ ............................ B29B 1/04; B29F 3/02
[52] U.S. Cl. .................................. 264/211; 264/210.6; 264/349; 523/351
[58] Field of Search .................... 264/211, 210.6, 349; 260/42.56; 523/351

[56] References Cited

U.S. PATENT DOCUMENTS

| | | | |
|---|---|---|---|
| Re. 29,040 | 11/1976 | Marzolf | 260/42.56 |
| 2,786,822 | 3/1957 | Vesce | 260/42.56 |
| 3,166,526 | 1/1965 | Butzler et al. | 260/31.8 |
| 3,261,793 | 7/1966 | Stevenson | 260/23.7 |
| 3,322,862 | 5/1967 | Havens et al. | 260/897 |
| 3,523,916 | 8/1970 | Needham et al. | 264/211 |
| 3,891,598 | 6/1975 | Marzolf | 260/42.56 |
| 4,046,849 | 9/1977 | Lever et al. | 264/211 |
| 4,102,974 | 7/1978 | Boni | 260/42.56 |

FOREIGN PATENT DOCUMENTS 2038861 7/1980 United Kingdom .

Primary Examiner—Jeffery R. Thurlow
Attorney, Agent, or Firm—D. R. Howard

[57] ABSTRACT

An improved process for adding magnesium oxide to polymeric compositions based on vinylidene chloride copolymers. The improvement comprises forming a pre-mixture of the magnesium oxide and an ethylene-vinylalkanoate dispersing medium or agent and thereafter blending an amount of the pre-mixture with the vinylidene chloride copolymer composition.

5 Claims, No Drawings

PROCESS FOR ADDING MAGNESIUM OXIDE TO FILM FORMING VINYLIDENE CHLORIDE COPOLYMER COMPOSITIONS

BACKGROUND OF THE INVENTION

This invention relates to an improved process for adding magnesium oxide to polymeric compositions based on vinylidene chloride copolymers.

Copolymers of vinylidene chloride with such copolymerizable monomers as acrylonitrile, vinyl chloride and lower alkyl acrylates have found use in the manufacture of filaments, sheets, tubes, films and extruded and molded shapes. It is known that such polymers are difficult to work with due to their brittleness, relatively poor melt flow and susceptibility to thermal degradation, as evidenced by the development of discoloration and by the generation of gas bubbles during fabrication of said polymers, and particularly during extrusion of film materials from said polymers. It has, heretofore, been common practice to incorporate plasticizers into vinylidene chloride polymer compositions to improve workability, or to reduce brittleness, of the polymer compositions. Thus, citric acid esters (see British Pat. No. 739,411), sebacic acid esters (see U.S. Pat. No. 2,604,458) and/or phthalate esters (see British Pat. No. 811,532) have been utilized in combination with vinylidene chloride polymers to produce film materials. Polymer compositions containing such plasticizers in conjunction with various stabilizer systems, e.g., combinations of an epoxidized soybean oil and an oxide of the metals of Group II of the periodic table, such as magnesium oxide, have also been used as disclosed, e.g., in U.S. Pat. No. 3,261,793 wherein a rubber-like copolymer compatible with the vinylidene chloride polymer was added to impart low temperature flexibility.

It is known that these plasticized vinylidene chloride copolymer compositions are less than wholly satisfactory for a number of reasons, e.g., most of the known plasticizers have poor compatibility with vinylidene chloride copolymer compositions and migrate to the surface of articles, such as films, produced therefrom. Plasticizer migration is especially disadvantageous where the polymeric film material is used in food wrapping applications. Further, the presence of such plasticizers often significantly reduces the tensile strength and tends to increase gas permeability, particularly permeability to water vapor and air, of polymeric films produced from the vinylidene chloride copolymers. As such, the addition of plasticizers to vinylidene chloride copolymer compositions to produce polymeric film material is not without problems. However, when film material is produced from normally crystalline vinylidene chloride copolymer compositions without the use of plasticizers, the resultant film material is frequently characterized by the presence of gas bubbles. Gas bubbles are detrimental where clear, continuous film material is required. It is believed that the gas bubbles result when the vinylidene chloride copolymer degrades via dehydrohalogenation to evolve gaseous hydrogen chloride.

A solution to the problem of gas bubbles has been disclosed in U.S. Pat. No. 3,891,598 wherein substantially plasticizer-free extruded film material comprising a blend of a normally crystalline vinylidene chloride interpolymer with small amounts of magnesium oxide was prepared in a process comprising the steps of admixing magnesium oxide in dry powdered form with dry powdered vinylidene chloride polymer to form an admixture; passing the admixture through a screen to remove any agglomerates having a diameter of greater than about 500 microns from the admixture; and extruding and stretching the admixture into film form. A special technique of adding the magnesium oxide to the vinylidene chloride polymer resin was devised to counteract the tendency of the magnesium oxide particles to cling to metal surfaces and to thereafter form agglomerates which subsequently break off into the extruder melt and result in holes in film formed from the extruded and stretched admixture. The special technique involved conducting the magnesium oxide powder via a flexible tube under the surface of dry vinylidene chloride copolymer particles while such polymeric particles were in motion in a ribbon or cone blender. However, stretched films so produced are often characterized by the presence of small white specks or agglomerates of magnesium oxide and frequently by the presence of small holes. U.S. Pat. No. 3,891,598 also discloses the use of ethylene vinylalkanoate copolymers, such as ethylene vinylacetate, to provide added strength and/or flexibility noting that when adding such materials it is preferable to add the ethylene vinylalkanoate copolymer to a blend of magnesium oxide and vinylidene chloride after the blend has been screened to remove agglomerates.

It is, therefore, the primary object of the present invention to produce vinylidene chloride polymer film materials characterized by reduced permeability to gases such as water vapor and air and which, in addition, can be thermally fabricated, e.g., extruded and stretched into film form, with the substantial absence of discoloration, bubbles, holes and agglomerates of magnesium oxide particles.

Additional related objects will become apparent from the following specification and claims.

SUMMARY OF THE INVENTION

The above and related objects are obtained in an improved process for preparing extruded vinylidene chloride copolymer film, said film being generally free from bubbles, holes and white specks, the film being derived from a composition comprising an amount of a dry, particulate, generally plasticizer-free, normally crystalline vinylidene chloride copolymer having polymerized therein from about 70 to about 95 percent by weight, based on the weight of polymer, of vinylidene chloride and from about 30 to about 5 percent by weight, based on the weight of polymer, of at least one monoethylenically unsaturated monomer copolymerized therewith, and a heat stabilizing amount of a magnesium oxide, the composition being processed into a film by conventional techniques, wherein the improvement comprises: (a) forming an admixture of the magnesium oxide and an ethylene-vinyl alkanoate dispersing aid or agent; and (b) mixing and extruding the vinylidene chloride copolymer powder with a sufficient amount of the admixture, the sufficient amount being that amount of the admixture which will yield an extrudate containing from about 0.05 to about 1.0 percent by weight, based on extrudate weight, of the magnesium oxide.

DESCRIPTION OF THE PREFERRED EMBODIMENTS

The normally crystalline vinylidene chloride polymers usable in this invention are well-known and may be prepared by interpolymerizing vinylidene chloride with known comonomers. Typical of the preferred normally crystalline vinylidene chloride copolymers are those having polymerized therein at least 70 percent by weight of vinylidene chloride, and preferably those having polymerized therein from about 70 to about 95 percent by weight vinylidene chloride, with the remainder being composed of one or more other monoethylenically unsaturated monomers copolymerized therewith exemplary of which are vinyl chloride, vinyl acetate, vinyl propionate, acrylonitrile, alkyl and aralkyl acrylates having alkyl and aralkyl groups of up to about 8 carbon atoms such as butylacrylate and methylacrylate, acrylic acid, allyl esters and ethers and butadiene. Average sizes of vinylidene chloride polymer particles may vary but are desirably less than about 300 microns.

Advantageously, the magnesium oxide contemplated by the present invention may have a weight average particle size up to and including about 15 microns. For obtaining optimum clarity in film structures prepared from such blends, however, it is preferred to utilize magnesium oxide having an average particle size of less than about 0.5 micron. The amount of magnesium oxide is desirably from about 0.05 to about 1.0 percent by weight, based upon weight of the vinylidene chloride copolymer. Preferably, the amount of magnesium oxide is from about 0.2 to about 0.8 percent by weight, based upon weight of the vinylidene chloride copolymer. Most preferably, the amount of magnesium oxide is from about 0.3 to about 0.7 percent by weight, based upon weight of the vinylidene chloride copolymer.

Ethylene vinylalkanoate copolymer dispersing agents may be prepared as disclosed in U.S. Pat. No. 3,322,862, the teachings of which are incorporated herein by reference thereto. The ethylene vinylalkanoate copolymers have polymerized therein from about 25 to about 85 percent by weight, based on copolymer weight, ethylene and from about 75 to about 15 percent by weight, based on copolymer weight, of a vinylalkanoate, the acid portion of said vinylalkanoate containing from about 2 to about 8 carbon atoms. Desirable vinylalkanoates are selected from the group consisting of vinyl acetate, vinyl propionate, vinyl butyrate, vinyl 2-ethyl hexoate and mixtures thereof. This listing is by no means exhaustive and is not to be construed as a limitation on the present invention. Preferably, the vinylalkanoate is vinyl acetate. The amount of ethylene vinylalkanoate is desirably from about 1 to about 12 percent by weight, based upon weight of the vinylidene chloride copolymer. Preferably, the amount of ethylene vinylalkanoate is from about 2 to about 10 percent by weight, based upon weight of the vinylidene chloride copolymer. Most preferably, the amount of ethylene vinylalkanoate is from about 3 to about 6 percent by weight, based upon weight of the vinylidene chloride copolymer.

It is believed that the ethylene-vinyl alkanoate copolymer dispersing aids or agents have two functions in accordance with the present invention. First, the ethylene-vinyl alkanoate copolymers are believed to function as a carrier matrix for the magnesium oxide particles or as a medium wherein the magnesium oxide particles are dispersed. Second, the ethylene-vinyl alkanoate copolymers are believed to function as an impact modifier for the extruded vinylidene chloride copolymer film.

Admixing magnesium oxide with the vinylidene chloride copolymer prevents gas bubble formation in a polymeric film formed therefrom without significant increase in the oxygen or water vapor transmission rates of such film. Further, the presence of the magnesium oxide permits utilization of significantly higher extrusion temperatures than is otherwise possible which, in turn, permits the use of vinylidene chloride polymers having a wide range of molecular weights in combination with high extrusion rates.

It is also known that magnesium oxide powder tends to cling to metal surfaces and in so doing tends to form agglomerates which break away from the metal surfaces during processing. U.S. Pat. No. 3,891,598 teaches that agglomerates such as these removed by screening. The present invention teaches an alternate solution. Admixing the magnesium oxide powder with the ethylene vinylalkanoate dispersing agent in accordance with the present invention counteracts the tendency of the magnesium oxide powder to cling to metal surfaces which in turn substantially lessens the likelihood that agglomerates will form. The net result is that by reducing the tendency to form agglomerates, a lesser quantity of magnesium oxide is required to accomplish a particular result than is mandated by prior art processes such as that taught in U.S. Pat. No. 3,891,598. In addition, the requirements for a special screening step to remove agglomerates having a size larger than about 500 microns and for special equipment to add the magnesium oxide powder to the vinylidene chloride copolymer formulation are eliminated.

The preferred process for blending the normally crystalline vinylidene chloride polymer particles with the magnesium oxide powder and the ethylene vinylalkanoate copolymer dispersing agent described herein comprises:

(a) forming an admixture of the magnesium oxide and the ethylene-vinylalkanoate copolymer dispersing agent by:
  (i) physically mixing from about 1 to about 50 percent by weight, based on weight of the admixture, of the magnesium oxide powder and from about 99 to about 50 percent by weight, based on weight of the admixture, of the ethylene-vinyl alkanoate copolymer;
  (ii) admixing the physically mixed magnesium oxide powder and ethylene-vinylalkanoate copolymer with a high shear mixing means, while the ethylene-vinylalkanoate copolymer is in a melt state, to disperse the Group II metal oxide powder in the ethylene-vinylalkanoate copolymer dispersing agent so that greater than 95 percent by weight, based on magnesium oxide weight, of the magnesium oxide powder has a particle size of less than about 0.5 square millimeter, preferably less than about 0.25 square millimeter; and
  (iii) extruding the result of step (ii) in a form that will permit cutting or grinding that which is extruded into particles or pellets having a diameter of no more than about 0.125 inches and a length of no more than about 0.125 inches; and
(b) mixing and extruding the vinylidene chloride copolymer particles with a sufficient amount of the admixture, the sufficient amount being that amount of the admixture which will yield an extrudate containing from about 0.05 to about 1.0 percent by weight, based on extrudate weight, of the magnesium oxide powder.

An alternative process for blending the normally crystalline vinylidene chloride polymer particles with the magnesium oxide powder and the ethylene-vinyl alkanoate copolymer described herein comprises:

(a) forming an admixed concentrate of the magnesium oxide and the ethylene-vinyl alkanoate copolymer dispersing agent by:

(i) physically mixing from about 1 to about 50 percent by weight, based on weight of the concentrate, of the magnesium oxide powder and from about 99 to about 50 percent by weight, based on weight of the concentrate, of the ethylene-vinyl alkanoate copolymer dispersing agent with a high shear mixing means, while the ethylene-vinylalkanoate copolymer is in a melt state, to disperse the magnesium oxide powder in the ethylene-vinylalkanoate copolymer dispersing agent or medium so that greater than 95 percent by weight, based on magnesium oxide powder weight, of the magnesium oxide powder has a particle size of less than about 0.5 square millimeter, preferably less than about 0.25 square millimeter; and (ii) extruding the result of step (i) in a form that will permit cutting or grinding that which is extruded into either pellets or particles having a diameter of no more than about 0.125 inches and a length of no more than about 0.125 inches; and (b) mixing and extruding the vinylidene chloride copolymer particles with an amount of the concentrate, the amount being sufficient to yield an extrudate containing from about 0.05 to about 1.0 percent by weight, based on extrudate weight, of the magnesium oxide powder, and a sufficient amount of the ethylene-vinyl alkanoate copolymer dispersing agent, the sufficient amount being that amount which will yield an extrudate containing from about 1 to about 12 percent by weight, based on extrudate weight, of the ethylene-vinyl alkanoate copolymer dispersing agent.

The polymeric compositions of the present invention may include impact modifiers, antioxidants, light stabilizers, and other additives known in the art which do not deleteriously affect the properties of the composition in the desired shape or form.

The above-described blends may be extruded, using conventional equipment, into single or multi-ply, oriented or unoriented film structures. Exemplary of highly useful multi-ply film structures are those as disclosed in U.S. Pat. No. 3,549,389, the teachings of which are incorporated herein by reference thereto. Such blends may also be used for preparation of oriented film structures by utilization of the bubble technique for making films in tubular form.

The compositions disclosed by the present invention are useful in other processes, such as molding, slot extrusion and other thermal fabrication techniques to form fibers, foils, molded articles and other forms having the superior properties.

The following specific examples are intended to illustrate the invention without limiting the scope thereof. All parts and percentages are by weight unless otherwise indicated.

EXAMPLES 1-3

In Examples 1-3, admixtures of magnesium oxide and ethylene-vinyl acetate (EVA) were prepared as noted in Table I below where ingredient A is an ethylene-vinyl acetate copolymer having polymerized therein 72 percent, based on copolymer weight, ethylene and 28 percent, based on copolymer weight, vinyl acetate and having a melt index of about 25 grams/10 minutes, commercially available under the trade designation ELVAX® 250 from E. I. duPont de Nemours and Company, ingredient B is a 15 micron weight average particle size magnesium oxide (MgO) commercially available under the trade designation MAGLITE®K from Calgon Corp., a Subsidiary of Merck & Co., Inc., and ingredient C is a 2-3 micron weight average particle size magnesium oxide (MgO) commercially available under the trade designation MAGLITE®S3331 from Calgon Corp., a Subsidiary of Merck & Co., Inc. Each admixture was prepared on a 5-pound capacity size 0 Banbury intensive mixer, the mixer operating at a speed of about 38 revolutions per minute. The admixture was then ground or pelletized into particles having a diameter of about 0.125 inches and a length of about 0.125 inches. The amount of admixture obtained was from about 10 to about 25 pounds. The figures present in Table I below are in terms of percent by weight based on weight of the admixture.

TABLE I

| Example No. | Ingredients | | |
|---|---|---|---|
| | A | B | C |
| 1 | 75 | — | 25 |
| 2 | 75 | 25 | — |
| 3 | 50 | — | 50 |

The admixtures set forth in Table I above were then further admixed using tumble blender with a rotating drum with an additional amount of ingredient A, the ethylene-vinyl acetate (EVA) copolymer and with an amount of ingredient D, a vinylidene chloride (VDC) copolymer having polymerized therein about 80 percent, based on weight of the copolymer, vinylidene chloride and about 20 percent, based on weight of the copolymer, vinyl chloride, the copolymer being commercially available under the trade designation 853 PTI from The Dow Chemical Company. The composition of each further admixture is set forth in Table II below.

TABLE II

| Example No. | Pounds EVA/ MgO Admixture | Pounds EVA | Pounds VDC Copolymer | % VDC Copolymer | % MgO | % EVA |
|---|---|---|---|---|---|---|
| 1 | 1.0 | 1.44 | 62.25 | 96.2 | 0.4 | 3.4 |
| 2 | 1.0 | 1.44 | 62.25 | 96.2 | 0.4 | 3.4 |
| 3 | 1.0 | 3.88 | 124.5 | 96.2 | 0.4 | 3.4 |

Each of the admixtures listed in Table II above was extruded into a four-layer film. The four layers were, respectively, low density polyethylene, ethylene-vinyl acetate, admixture, and ethylene-vinyl acetate. An apparatus generally in accordance with that described in U.S. Pat. No. 3,487,505 and a process generally in accordance with that described in U.S. Pat. No. 3,557,265 were used in making the four-layer films. The admixture layer was extruded using a 3.5 inch extruder. The extruder had a barrel and a hollow multizone temperature controlled extruder screw. The screw had a length to diameter ratio of 24 to 1 and two internal cooling zones. The cooling zones were (1) a feed zone cooled with water at a temperature of about 134° F. and (2) a melt zone cooled with steam at a temperature of about 364° F. The barrel had an unheated feed zone, the feed zone had a length of about one foot, four (4) heating zones of about equal length, and a discharge end or die receiving flange. The heating zones were consecutively numbered commencing with zone one, zone one being proximate to the feed zone, and terminating with zone four, zone four being proximate to the discharge end. The heating zones had temperatures of Zone 1, about 325° F.; Zone 2 about 354° F.; Zone 3, about 335°–345° F.; and Zone 4, about 335°–345° F. The discharge end was heated to a temperature of about 350° F. The ethylene-vinyl acetate layers were extruded using a 3.5 inch extruder. The extruder had a barrel and an extruder screw. The screw had a length to diameter ratio of 24 to 1. The barrel had an unheated feed zone, the feed zone having a length of about one foot, four (4) heating zones of about equal length, and a discharge end or die receiving flange. The heating zones were consecutively numbered commencing with zone one, zone one being proximate to the feed zone, and terminating with zone four, zone four being proximate to the discharge end. The heating zones had temperatures as follows: Zone 1, about 320° F.; Zone 2, about 275° F.; Zone 3, about 335° F.; and Zone 4, about 335° F. The discharge end was heated to a temperature of about 345° F. The low density polyethylene layer was extruded using a 4.5 inch extruder. The extruder had a barrel and an extruder screw, the screw had a length to diameter ratio of 24 to 1. The barrel had an unheated feed zone, the feed zone had a length of about one foot, five (5) heating zones of about equal length and a discharge end or die receiving flange. The heating zones were consecutively numbered commencing with zone one, zone one being proximate to the feed zone, and terminating with zone five, zone five being proximate to the discharge end. The heating zones had the following temperatures: Zone 1, about 325° F.; Zone 2, about 375° F.; Zone 3, about 400° F.; Zone 4, about 450° F.; and Zone 5, about 450° F. The discharge end was heated to a temperature of about 450° F. The four layers were combined using an apparatus and a method generally in accordance with the aforementioned U.S. Pat. Nos. 3,487,505 and 3,557,265 respectively, and extruded as a flat film using a 60 inch die. The die had an internal configuration, generally that of a coat hanger. The flat film was cast upon a chill roll. The chill roll had a temperature of from about 100° to about 110° F. Extrusion rates of the extruders and the chill roll speed were such that the film has a final thickness of about 2 mils, the layers of low density polyethylene, ethylene-vinyl acetate, admixture and ethylene-vinyl acetate had respective thicknesses of about 0.95 mil, about 0.2 mil, about 0.25 mil and about 0.6 mil.

The four-layer films were then visually evaluated as the films were being made for the presence of gas bubbles, white specks and agglomerates with the following results as tabulated in Table III below.

TABLE III

| Example No. | Agglomerates | Gas Bubbles | White Specks |
|---|---|---|---|
| 1 | None | None | None |
| 2 | None | None | None |

TABLE III-continued

| Example No. | Agglomerates | Gas Bubbles | White Specks |
|---|---|---|---|
| 3 | None | None | None |

By way of comparison, a four-layer film was formed in the same manner as in Examples 1–3 with the exception that a layer containing only the vinylidene chloride copolymer was used instead of the layer containing the admixture of the vinylidene chloride copolymer, magnesium oxide and ethylene-vinylacetate. The resultant four-layer film was very brown, rather than clear as in Examples 1–3. In addition, the resultant four-layer film contained small bubbles.

Similar results are obtained with other vinylidene chloride copolymers and with other ethylene-vinyl alkanoate copolymers.

In light of the foregoing examples, it is clear that, by using an ethylene-vinylalkanoate dispersing agent such as ethylene-vinyl acetate, one can eliminate both the need for a separate screening step to remove agglomerates and the need for special equipment to add the magnesium oxide to the vinylidene chloride copolymer while producing a film with substantially no agglomerates, gas bubbles or white specks.

What is claimed is:

1. An improved process for preparing extruded vinylidene chloride copolymer film, said film being generally free from bubbles, holes and white specks, the film being derived from a composition comprising an amount of a dry, particulate, generally plasticizer-free, normally crystalline vinylidene chloride polymer having polymerized therein from about 70 to about 95 percent by weight, based on the weight of polymer, of vinylidene chloride and from about 30 to about 5 percent by weight, based on the weight of polymer, of at least one monoethylenically unsaturated monomer copolymerized therewith, and a heat stabilizing amount of magnesium oxide, the composition being processed into a film by conventional techniques, wherein the improvement comprises:

(a) forming an admixture of the magnesium oxide and the ethylene-vinylalkanoate copolymer dispersing agent by:

(i) physically mixing from about 1 to about 50 percent by weight, based on weight of the admixture, of the magnesium oxide powder and from about 99 to about 50 percent by weight, based on weight of the admixture, of the ethylene-vinyl alkanoate copolymer;

(ii) admixing the physically mixed magnesium oxide powder and ethylene-vinylalkanoate copolymer with a high shear mixing means, while the ethylene-vinylalkanoate copolymer is in a melt state, to disperse the Group II metal oxide powder in the ethylene-vinylalkanoate copolymer dispersing agent so that greater than 95 percent by weight, based on magnesium oxide weight, of the magnesium oxide powder has a particle size of less than about 0.5 square millimeter, preferably less than about 0.25 square millimeter; and (iii) extruding the result of step (ii) in a form that will permit cutting or grinding that which is extruded into particles or pellets having a diameter of no more than about 0.125 inches and a length of no more than about 0.125 inches; and (b) mixing and extruding the vinylidene chloride copolymer particles with a sufficient amount of the admixture, the sufficient amount being that amount of the admixture which will yield an extrudate containing from about 0.05 to about 1.0 percent by weight, based on extrudate weight, of the magnesium oxide powder.

2. An improved process for preparing extruded vinylidene chloride copolymer film, said film being generally free from bubbles, holes and white specks, the film being derived from a composition comprising an amount of a dry, particulate, generally plasticizer-free, normally crystalline vinylidene chloride polymer having polymerized therein from about 70 to about 95 percent by weight, based on the weight of polymer, of vinylidene chloride and from about 30 to about 5 percent by weight, based on the weight of polymer, of at least one monoethylenically unsaturated monomer copolymerized therewith, and a heat stabilizing amount of magnesium oxide, the composition being processed into a film by conventional techniques, wherein the improvement comprises:

(a) forming an admixed concentrate of the magnesium oxide and the ethylene-vinyl alkanoate copolymer dispersing agent by:
  (i) physically mixing from about 1 to about 50 percent by weight, based on weight of the concentrate, of the magnesium oxide powder and from about 99 to about 50 percent by weight, based on weight of the concentrate, of the ethylene-vinyl alkanoate copolymer dispersing agent with a high shear mixing means, while the ethylene-vinylalkanoate copolymer is in a melt state, to disperse the magnesium oxide powder in the ethylene-vinylalkanoate copolymer dispersing agent or medium so that greater than 95 percent by weight, based on magnesium oxide weight, of the magnesium oxide powder has a particle size of less than about 0.5 square millimeter, preferably less than about 0.25 square millimeter; and
  (ii) extruding the result of step (i) in a form that will permit cutting or grinding that which is extruded into either pellets or particles having a diameter of no more than about 0.125 inches and a length of no more than about 0.125 inches; and (b) mixing and extruding the vinylidene chloride copolymer particles with an amount of the concentrate, the amount being sufficient to yield an extrudate containing from about 0.05 to about 1.0 percent by weight, based on extrudate weight, of the magnesium oxide powder, and a sufficient amount of the ethylene-vinyl alkanoate copolymer dispersing agent, the sufficient amount being that amount which will yield an extrudate containing from about 1 to about 12 percent by weight, based on extrudate weight, of the ethylene-vinyl alkanoate copolymer dispersing agent.

3. The process of claim 1 or claim 2 wherein the ethylene-vinyl alkanoate dispersing agent is ethylene-vinyl acetate.

4. The process of claim 1 or claim 2 wherein the monoethylenically unsaturated monomer is vinyl chloride.

5. The process of claim 1 or claim 2 wherein the magnesium oxide has a particle size of less than about 0.5 micron.

* * * * *